United States Patent Office 3,118,891
Patented Jan. 21, 1964

3,118,891
DISULFAMIC ACIDS AND RELATED COMPOUNDS
Walter E. Kramer, Niles, Ill., assignor to The Pure Oil
Company, Chicago, Ill., a corporation of Ohio
No Drawing. Filed Dec. 30, 1960, Ser. No. 79,520
22 Claims. (Cl. 260—279)

This invention relates to new and useful sulfamic acids and related compounds derived from heterocyclic aromatic amines, and to salts and esters thereof, and to methods of preparing said acids, salts, and esters.

During the period from 1914 to about 1921, there were reported in the literature the results of experimental work by Bruno Emmert on the reactions of pyridine with the alkali metals. Typical reports of this work are found in Berichte, 47, 2598 (1914); 49, 1060 (1916); 50, 31 (1917); 52, 1352 (1919); 53, 370 (1920); and 54, 204 (1921). In these publications, Emmert reported that sodium will react with pyridine to produce a disodium-tetrahydrodipyridyl compound. Emmert also reported the formation of similar compounds by reaction of sodium with other aromatic heterocyclic amines, such as quinoline, acridine, and the like. In the co-pending application of Walter E. Kramer, Lewis A. Joo, and Robert M. Haines, Serial No. 28,866, filed May 13, 1960, a process is described in which a variety of dialkali-metal amides are formed by the reaction of alkali metals with aromatic heterocyclic amines, which compounds are converted to dibasic acids by reaction with carbon dioxide. The dibasic acid salts which are formed, and various derivatives thereof, are novel compounds previously unreported in the literature. This invention is concerned with the preparation of sulfamite salts and derivatives thereof, and sulfamic acids, salts, and esters from the alkali metal dipyridyl compounds and their analogs which are described in the aforementioned co-pending application of Kramer et al.

One of the objects of this invention is the provision of a novel class of compounds derived from aromatic heterocyclic amines.

Another object of this invention is the provision of novel sulfamate and sulfamite compounds derived from aromatic heterocyclic amines.

Another object of this invention is the provision of a novel process for the preparation of sulfamate and sulfamite compounds from aromatic heterocyclic amines.

A feature of this invention is the provision of novel compounds selected from the group consisting of,

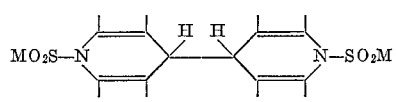

where M is an alkali metal,

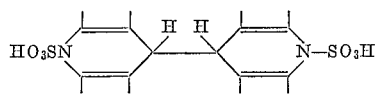

and esters and salts thereof, where the nuclei,

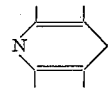

are derived from a heterocyclic aromatic amine.

Another feature of this invention is the provision of a process in which an alkali metal derivative of an aromatic heterocyclic amine is reacted with sulfur dioxide to produce a metal disulfamite salt which may be converted to a disulfamate salt by oxidation, and to a sulfamic acid by acid hydrolysis of the disulfamate salt.

Other objects and features of this invention will become apparent from time to time throughout the specification and claims as hereinafter related.

This invention is based upon the discovery that compounds of the type described by Emmert, and described in the aforementioned co-pending patent application of Kramer et al., can be utilized in the preparation of novel sulfamite and sulfamate compounds. In my invention, alkali metal, such as sodium, potassium, lithium, etc., and mixtures thereof, such as sodium-potassium alloys, are reacted with heterocyclic aromatic amines, such as pyridine, quinoline, acridine, and the like, to form intermediate diamides of the formula,

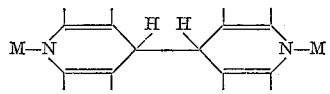

where M is an alkali metal and the nitrogen-containing nuclei are derived from a heterocyclic aromatic amine. The intermediate diamide which is formed is reacted in suspension or solution in an inert solvent at a temperature in the range from about −30° to +50° C. with sulfur dioxide to produce a disulfamite salt of the formula,

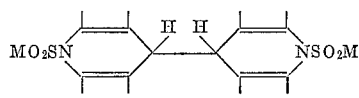

The disulfamite salt which is thus obtained is a useful intermediate in the formation of a variety of organic compounds. When these salts are acidified with a strong acid, a solid polymer is obtained which is substantially the same as that described in the aforementioned coponding application of Kramer et al. When these disulfamite salts are reacted with halogenated hydrocarbons, esters are obtained of the formula,

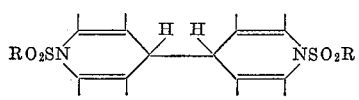

When these disulfamite salts are reacted with polyhalogenated hydrocarbons, polymers are produced which contain repeating functional groups derived from the sulfamite salts and repeating functional groups derived from the halogenated hydrocarbon.

The disulfamite salt described above can be converted to a disulfamate salt by oxidation. The sulfamite salt is recovered by evaporation of solvent and dissolved in a minimum amount of water or other inert solvent. The solution is mixed with hydrogen peroxide and maintained at a temperature of about 0° to 20° C. for several hours. The sulfamite salt is thereby converted to a disulfamate salt of the formula,

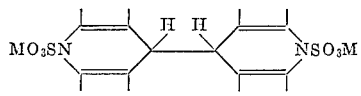

The disulfamate salt which is thus formed can be converted to an ester or a polyester by reaction with a mono- or polyhalogenated hydrocarbon. When the sulfamate salt is acidified with a strong acid, it is converted to a sulfamic acid of the formula,

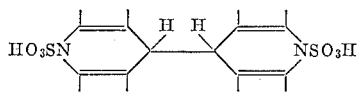

This sulfamic acid may be converted to salts, esters, and other derivatives by reactions well-known in the art.

The disulfamite salts obtained in the initial phase of this process are useful as intermediates in the preparation of the disulfamate salts and as intermediates in the preparation of sulfamite esters and polyesters. The disulfamate salt which is produced by oxidation of the disulfamite salt is useful as an intermediate in the preparation of esters and polyesters, and in the production of the novel disulfamic acid described above. The disulfamic acid which is obtained in this process is useful as a herbicide, defoliant, curing agent for phenolic resins, additive for electroplating baths, etc. These disulfamic acids are particularly useful as metal cleaning agents because they are capable of removing surface oxides from metal without excessive etching of the metal surface. This property is especially valuable in cleaning copper and silver in preparation for plating or other treatment, and permits the deposition of fine coatings in nickel-plating operations.

In preparing the novel compounds of this invention, a dispersion of an alkali metal, such as sodium, lithium, potassium, or sodium-potassium alloy, is formed in an inert solvent. The solvent or liquid reaction medium used is preferably a mineral oil, such as a white oil, although other inert solvents can be used, such as hydrogenated aromatic extracts of mineral oils, xylene; and ethers and acetals, such as diethyl ether, dipropyl ether, dioctyl ether, dimethoxyethane, methylal, dimethyl ether of diethylene glycol, etc. When liquid sodium-potassium alloys are used, a mixed sodium-potassum product is obtained and the liquid reaction medium may be eliminated. The dispersion of the alkali metal in the inert solvent is then added to an aromatic heterocyclic amine, such as pyridine, quinoline, acridine, or derivatives thereof containing only inert substituents, e.g., picoline, lutidine, or the other mono-, di-, tri-, or tetraalkyl derivatives of pyridine, esters or salts of nicotinic acid, 2-benzylpyridine, 2,3,6-collidine, etc., while maintaining the reaction at a relatively low temperature, e.g., —50° to +50° C., preferably —25° to +10° C. Under these conditions, the alkali metal reacts with the aromatic heterocyclic amine, i.e., adds at the nitrogen atom, with the result that the aromatic amine dimerizes and there is formed a dialkali metal amide of the aromatic amine dimer. In the case of pyridine and sodium, the reaction is as follows:

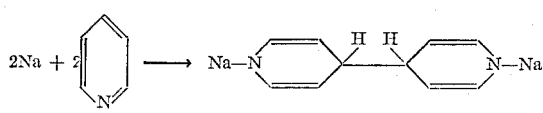

Since this reaction is one which takes place with all of the aromatic heterocyclic amines, the general reaction is as follows:

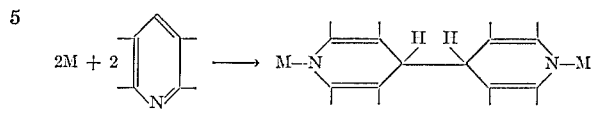

where M is an alkali metal, and

represents the nucleus of an aromatic heterocyclic amine.

After the alkali metal diamide of the aromatic amine is formed, it is then reacted with sulfur dioxide to form a dialkali-metal salt of the formula:

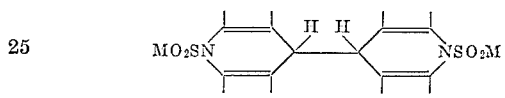

where M is an alkali metal and the nitrogen-containing nuclei are derived from the pyridine (or other aromatic heterocyclic amine). The reaction is carried out using gaseous sulfur dioxide, although liquid sulfur dioxide can be used if the reaction is carried out under pressure. The alkali metal salt which is thus formed is stable and can be recovered in relatively pure form by filtration, washing, and drying techniques. As noted above, this product can be converted to a polymer by acidification, or it can be reacted with halogenated hydrocarbons to produce esters or polyesters. The dialkali metal disulfamite salt can be converted to a disulfamate salt by oxidation with hydrogen peroxide, or other oxidizing agent, e.g., oxygen or air with an oxidation catalyst, nitrogen dioxide, etc. While acidification of the disulfamite salt produces a polymer, the acidification of the disulfamate salt produces a stable disulfamic acid.

The following non-limiting examples are illustrative of this invention:

EXAMPLE 1

A sodium dispersion was prepared by heating two mols of sodium and 500 g. of xylene to about 100° C., with agitation. The dispersion was then cooled to room temperature and 300 ml. of pyridine were added, whereupon the solution turned first yellow, then black. Next, the mixture was cooled to 0° C., and after about 20 minutes, the introduction of sulfur dioxide by bubbling was started. The flow of sulfur dioxide continued for two hours, until the dark reaction mixture became light yellow, while maintaining the temperature of the mixture at about 0° C. After the introduction of sulfur dioxide had been completed, the reaction mixture was warmed to room temperature and filtered to recover the salt formed during the reaction. The salt was then washed with ether to remove the residual solvent and pyridine. The salt which was thus obtained was a disodium disulfamite of the formula:

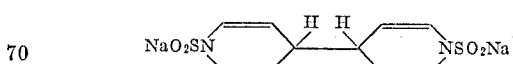

The disulfamite salt was then dissolved in water and the solution cooled to 10° C. The solution was then mixed with 100 ml. of hydrogen peroxide and stirred for about eight hours. The disulfamite salt was thereby oxidized to a disulfamate salt of the formula:

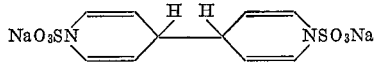

A stoichiometric amount of concentrated sulfuric acid was then added to convert the disodium disulfamate salt to the free acid,

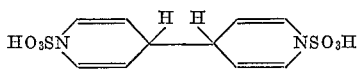

The resulting solution was then cooled to 0° C. and filtered to remove precipitated sodium sulfate. Thereafter, the solution was concentrated by evaporation and was filtered again to remove the remaining sodium sulfate precipitate, after which the last traces of water were removed from the product by applying a vacuum. The yield of 4,4'-tetrahydrodipyridyldisulfamic acid was substantially quantitative. The acid is useful as a herbicide, defoliant, ingredient of electroplating baths, and is especially useful for removing surface oxides from metals without excessive etching of the metal surface.

EXAMPLE 2

A portion of the disodium disulfamite salt, produced as described in Example 1 by reaction of the sodium-pyridine compound with sulfur dioxide, was acidified by addition of strong hydrochloric acid. Upon addition of acid, a gas (presumably sulfur dioxide) was evolved in copious quantities and a large amount of a polymer was precipitated. The polymer was substantially the same as that obtained by acidification of disodium 4,4'-tetrahydrodipyridylcarbamate in the aforementioned co-pending patent application of Kramer et al.

EXAMPLE 3

When the disodium disulfamite salts produced in accordance with Example 1 are reacted with mono- or dihalogenated hydrocarbons, there are produced esters of the disulfamous acids. When a monohalogenated aliphatic hydrocarbon is reacted with these salts, the product obtained is a diester. When a dihalogenated or polyhalogenated aliphatic hydrocarbon is reacted with these salts, the product obtained is a polyester. In carrying out this reaction, it is preferred that reactants be dissolved in a non-aqueous solvent, preferably a polar solvent, such as ethylene glycol. A typical procedure for the preparation of ester derivatives of the disulfamite intermediate is as follows: A one-mol portion of disodium 4,4'-tetrahydrodipyridyldisulfamite, prepared in accordance with Example 1, is dissolved in 1500 g. of ethylene glycol. Then two mols of propyl bromide are added and the mixture is stirred and heated for several hours at the reflux temperature of the propyl bromide. A precipitate of sodium bromide forms slowly, and after the reaction has been completed, the glycol and precipitated sodium bromide are washed out with water. The remaining ester is purified by conventional extraction and distillation techniques. The ester which is produced in this reaction has the formula:

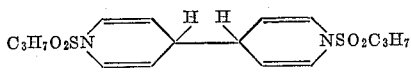

This ester is a liquid which is useful as a plasticizer and also has lubricating properties.

A one-mol portion of disodium 4,4'-tetrahydrodipyridylsulfamite, prepared in accordance with Example 1, is dissolved in 1500 g. of ethylene glycol. Then 0.5 mol of 1,4-dibromobutane is added, and the mixture is stirred and heated for several hours at a temperature sufficient to reflux the dibromobutane. A precipitate of sodium bromide slowly separates from the solution and the solution becomes viscous as the result of the formation of a polyester. After the reaction has been completed, the glycol and sodium bromide are washed out with water, and the resulting ester is purified further by washing and by solvent extraction. The product is a solid thermoplastic material which may be used as a base for alkyd-type coatings.

In preparing esters and polyesters in accordance with this example, any halogenated hydrocarbon of 1 to 20 carbon atoms per molecule may be used. The halogenated hydrocarbon may be saturated or unsaturated, straight chain or branched chain, acylic or alicyclic, or mixed. Halogenated hydrocarbons which may be used in preparing these ester derivatives include methyl bromide, ethyl chloride, propyl bromide, butyl bromide, amyl bromide, octyl chloride, octadecyl chloride, vinyl chloride, allyl chloride, 1-chloro-1-octene, cyclohexyl-bromide, etc. Similarly, any $C_1$–$C_{20}$ dihalogenated or polyhalogenated hydrocarbons may be used in the preparation of polyesters as described above. Polyhalogenated hydrocarbons which may be used in preparing these polyesters include methylene dibromide, ethylene bromide, 1,3-dibromopropane, propylene chloride, 1,5-dichloropentane, 1,10-dibromodecane, 1,18-dibromooctadecane, 1,3-dichloropropene, 1,4-dibromo-2-butene, 1,4-dibromocyclohexane, etc.

EXAMPLE 4

When the disodium salts of 4,4'-tetrahydrodipyridyl-disulfamic acid, produced in accordance with Example 1, are reacted with mono- or dihalogenated hydrocarbons, there are produced esters of the disulfamic acid. Where a monohalogenated hydrocarbon is reacted with these salts, the product obtained is a diester. When a dihalogenated or polyhalogenated hydrocarbon is reacted with this salt, the product obtained is a polyester. In carrying out this reaction, it is preferred that the reactants be dissolved in a non-aqueous solvent such as ethylene glycol. A typical procedure for the preparation of esters of 4,4'-tetrahydrodipyridyldisulfamic acid is as follows: A one-mol portion of disodium 4,4'-tetrahydrodipyridyldisulfamate, prepared in accordance with Example 1, is dissolved in 1500 g. of ethylene glycol. Then 2 mols of hexyl bromide are added and the mixture is stirred and heated for several hours at the reflux temperature of hexyl bromide. A precipitate of sodium bromide forms slowly, and after the reaction has been completed, the glycol and precipitated sodium bromide are washed out with water. The ester which is produced in this reaction has the formula,

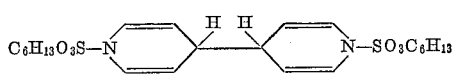

This ester is a liquid which is useful as a plasticizer and also as a synthetic lubricant or hydraulic fluid. When other halogenated hydrocarbons are reacted with the disodium salt in accordance with this example, similar diesters are obtained. In general, any halogenated hydrocarbon may be used, although $C_1$–$C_{20}$ halogenated hydrocarbons are preferred. The halogenated hydrocarbons may be saturated or unsaturated, straight chain or branched chain, acylic or alicyclic, or mixed, e.g., methyl bromide, ethyl chloride, propyl bromide, butyl bromide, amyl bromide, octyl chloride, octadecyl chloride, vinyl chloride, allyl chloride, cyclohexyl bromide, etc.

EXAMPLE 5

A one-mol portion of disodium 4,4'-tetrahydrodipyridyldisulfamate, prepared in accordance with Example 1, is dissolved in 1500 g. of ethylene glycol. Then 0.5 mol of 1,4-dibromobutane is added, and the mixture is stirred and heated for several hours at the reflux temperature of dibromobutane. A precipitate of sodium bromide slowly separates from the solution and the solution becomes viscous as the result of the formation of a polyester. After completion of the reaction, the glycol and sodium bromide are washed out with water and the resulting ester is purified further by washing and by solvent extraction. The product is a solid thermoplastic material which may be used in wire coatings. Similarly, any $C_1$–$C_{20}$ dihalogenated or polyhalogenated hydrocarbons may be used in the preparation of polyesters as described above. Polyhalogenated hydrocarbons which may be used in preparing these polyesters include methylene dibromide, ethylene bromide, 1,3-dibromopropane, propylene chloride, 1,5-dichloropentane, 1,10-dibromodecane, 1,18-dibromooctadecane, 1,3-dichloropropene, 1,4-dibromo-2-butene, 1,4-dibromocyclohexane. etc.

EXAMPLE 6

A dispersion of sodium and potassium in white oil is prepared by dispersing 34 g. of a eutectic alloy of sodium and potassium in 150 g. of white oil. The dispersion is carried out by mixing with high-speed agitation at room temperature. After the sodium and potassium have been thoroughly dispersed, 250 ml. of anhydrous pyridine are added. An immediate reaction takes place as evidenced by change of color of the solution. Next, the solution is cooled to 0° C. and stirred for about 20 minutes. Then the introduction of sulfur dioxide by bubbling is started and is continued until the dark color of the reaction mixture has changed to yellow, while maintaining the temperature of the mixture at about 0° C. After the introduction of sulfur dioxide has been completed, the reaction mixture is warmed to room temperature and filtered to recover the disulfamite salt formed during the reaction. The salt is then washed with ether to remove the residual solvent and pyridine. The salt which is thus obtained is a dialkali metal disulfamite of the formula,

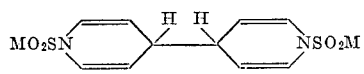

where M is sodium or potassium. The salt which is obtained is a mixture of disodium salts, dipotassium salts, and mixed sodium-potassium salts.

The disulfamite salt is then dissolved in water and the solution cooled to 10° C. The solution is then mixed with 100 ml. of hydrogen peroxide and stirred for about 8 hours. The disulfamite salt is thereby oxidized to a disulfamate salt of the formula,

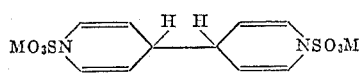

where M is sodium or potassium. A stoichiometric amount of concentrated sulfuric acid is then added to convert the sodium-potassium disulfamate to the free disulfamic acid as obtained in Example 1. The acid is recovered and purified as described in Example 1.

EXAMPLE 7

A sodium dispersion is prepared by heating 2 mols of sodium and 500 g. of xylene to about 100° C. with agitation. The dispersion is then cooled to room temperature and 2 mols of acridine dissolved in 300 ml. of anhydrous ether are added. The solution is cooled to 0° C. and stirred for about twenty minutes. Sulfur dioxide is then bubbled through the mixture until the dark color changes to a light yellow, while maintaining the mixture at about 0° C. After the introduction of sulfur dioxide has been completed, the reaction mixture is warmed to room temperature and filtered to recover the salt formed during the reaction. The salt is then dissolved in water and washed with ether to remove residual solvent and unreacted acridine. The aqueous solution which remains is poured into a large excess of n-butanol whereupon a precipitate is formed. The precipitate is recovered, washed, dried, and is a tetrahydrodiacridyldisulfamite of the formula,

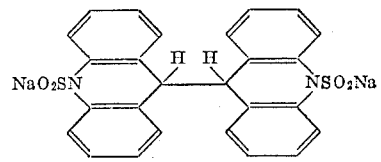

The disulfamite salt is then dissolved in water and the solution cooled to 10° C. The solution is then mixed with 100 ml. of hydrogen peroxide and stirred for about eight hours. The disulfamite salt is thereby oxidized to a disulfamate salt of the formula:

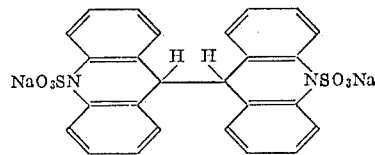

A stoichiometric amount of concentrated sulfuric acid is then added to convert the disodium disulfamate salt to the free acid:

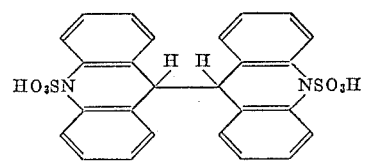

The resulting solution is then cooled to 0° C. and filtered to remove precipitated sodium sulfate. Thereafter, the solution is concentrated by evaporation and is filtered again to remove the remaining sodium sulfate precipitate, after which the last traces of water are removed from the product by applying a vacuum. The yield of tetrahydrodiacridyldisulfamic acid is substantially quantitative. This acid is useful as a herbicide, defoliant, ingredient of electroplating baths, and is especially useful for removing surface oxides from metals without excessive etching of the metal surface.

When other heterocyclic aromatic amines are substituted in this process, the corresponding disodium sulfamite and sulfamate salts are obtained and the corresponding disulfamic acid is obtained as set forth in Table I.

*Table 1*

| Amine + Na + SO₂ ⟶ Disulfamite product | + | H₂O₂ ⟶ Disulfamate product | + | H₂SO ⟶ Disulfamic acid |
|---|---|---|---|---|

When the disodium sulfamite and sulfamate salts produced in accordance with this example are reacted with mono- or dihalogenated hydrocarbons, as described in Examples 3, 4, and 5, there are produced esters or polyesters as previously described. Where a monohalogenated hydrocarbon is reacted with these salts, the product obtained is a dihydrocarbyl ester. When a dihalogenated or polyhalogenated hydrocarbon is reacted with these salts, the product obtained is a polyester. The acids which are produced in accordance with this example are useful as herbicides, defoliants, as ingredients in electroplating baths, and are especially useful as metal cleaners for removing surface oxides. The diesters which are derived from these compounds are useful as plasticizers, synthetic lubricants, and hydraulic fluids. The polyesters which are derived from these salts are useful as casting resins and as coating resins.

While I have described this invention fully and completely with special emphasis upon several embodiments thereof, as required by the patent laws, I wish it to be understood that within the scope of the appended claims, this invention may be practiced otherwise than as specifically described herein.

The embodiments of the invention in which an exclusive property or privilege is claimed are defined as follows:

1. A compound of the formula:

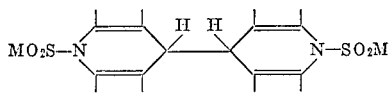

where M is an alkali metal and

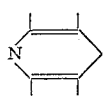

represents a radical of the group consisting of

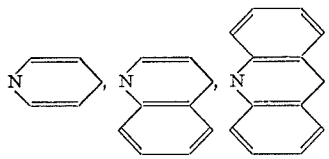

and lower-alkyl substituted derivatives thereof.

2. A compound of the formula:

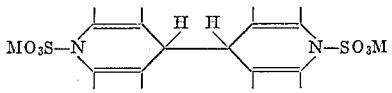

where M is an alkali metal and

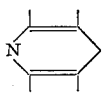

represents a radical of the group consisting of

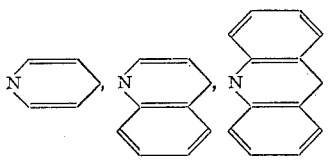

and lower-alkyl substituted derivatives thereof.

3. A compound of the formula:

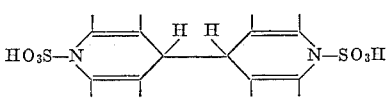

where

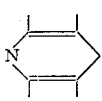

represents a radical of the group consisting of

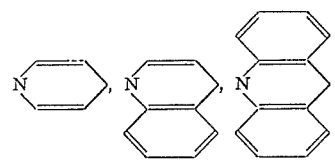

and lower-alkyl substituted derivatives thereof.

4. A compound of the formula:

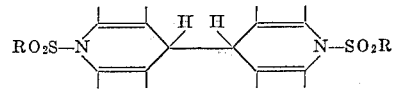

where R is a $C_1$–$C_{20}$ monovalent hydrocarbon radical of the group consisting of saturated aliphatic, mono-olefinic, and alicyclic radicals and

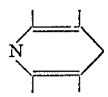

represents a radical of the group consisting of

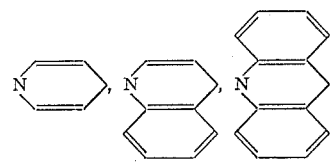

and lower-alkyl substituted derivatives thereof.

5. A compound of the formula:

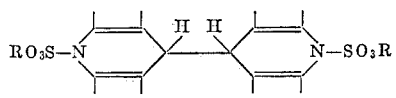

where R is a $C_1$–$C_{20}$ monovalent hydrocarbon radical of the group consisting of saturated aliphatic, mono-olefinic, and alicyclic radicals and

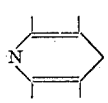

represents a radical of the group consisting of

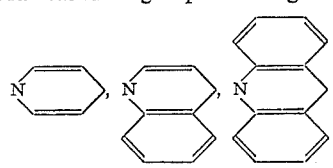

and lower-alkyl substituted derivatives thereof.

6. A compound of the formula:

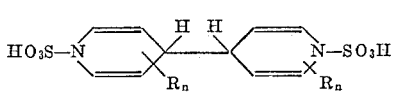

where R is a lower alkyl and $n$ is 0 to 4.

7. A compound in accordance with claim 6 in which R is a methyl radical and $n$ is 1.

8. The compound of the formula:

9. The compound of the formula:

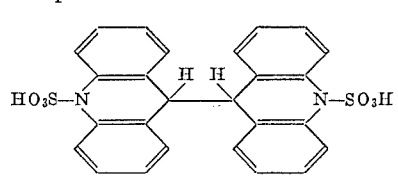

10. The compound of the formula:

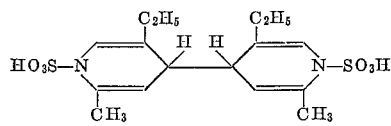

11. A method of preparing disulfamite salts which comprises reacting a compound of the formula:

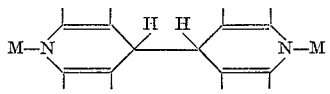

where M is an alkali metal and

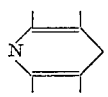

represents a radical of the group consisting of

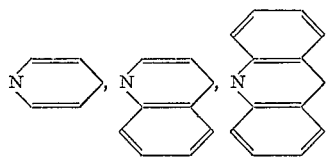

and lower-alkyl substituted derivatives thereof, with $SO_2$ to produce a disulfamite salt of the formula:

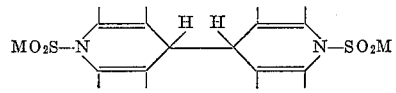

12. A method in accordance with claim 11 in which the reaction is carried out in an inert solvent at a temperature of about $-25°$ to $+25°$ C.

13. A method of preparing disulfamate salts which comprises reacting a disulfamite salt of the formula:

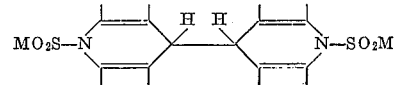

where M is an alkali metal and

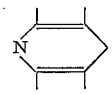

represents a radical of the group consisting of

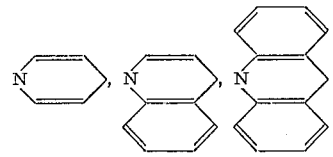

and lower-alkyl substituted derivatives thereof, with an oxidizing agent capable of oxidizing said disulfamite salt to yield a disulfamate salt of the formula:

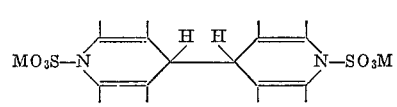

14. A method of preparing sulfamic acids which comprises reacting a disulfamite salt of the formula:

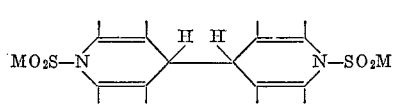

where M is an alkali metal and

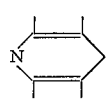

represents a radical of the group consisting of

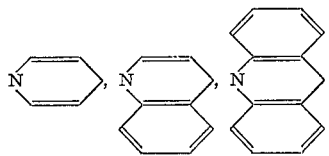

and lower-alkyl substituted derivatives thereof, with an oxidizing agent capable of oxidizing said disulfamite salt to produce a disulfamate salt and acidifying the disulfamate salt to produce an acid of the formula:

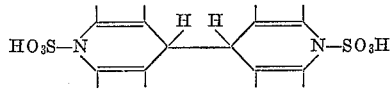

15. A method of preparing esters which comprises reacting a compound of the group consisting of salts of the formulas:

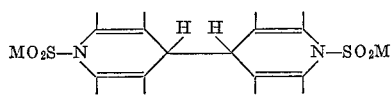

and

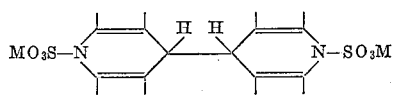

where M is an alkali metal and

represents a radical of the group consisting of

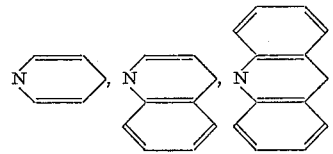

and lower-alkyl substituted derivatives thereof, with a mono-halogenated $C_1$–$C_{20}$ hydrocarbon of the group consisting of saturated aliphatic, mono-olefinic and alicyclic hydrocarbons.

16. A method of preparing disulfamite salts which comprises reacting a compound of the formula:

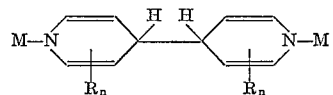

where M is an alkali metal, R is a lower alkyl radical, and $n$ is an integer of 0 to 4, with $SO_2$ to produce a disulfamite salt of the formula:

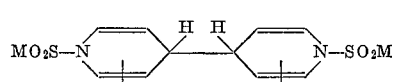

17. A method of preparing disulfamate salts which comprises reacting a disulfamite salt of the formula:

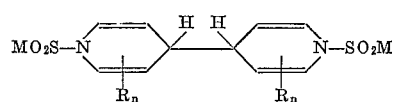

where M is an alkali metal, R is a lower alkyl radical, and $n$ is an integer of 0 to 4 with an oxidizing agent capable of oxidizing said disulfamite salt to yield a disulfamate salt of the formula:

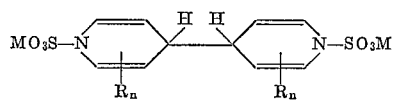

18. A method of preparing sulfamic acids which comprises reacting a disulfamite salt of the formula:

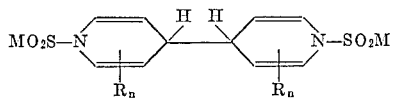

where M is an alkali metal, R is a lower alkyl radical, and $n$ is an integer of 0 to 4, with an oxidizing agent capable of oxidizing said disulfamite salt to produce a disulfamate salt and acidifying the disulfamate salt to produce an acid of the formula:

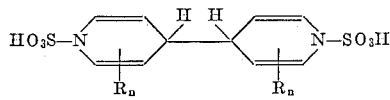

19. A method of preparing heterocyclic sulfamic acids which comprises reacting a disulfamite salt of the formula:

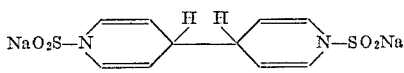

with hydrogen peroxide to produce a disulfamate salt, and acidifying the disulfamate salt to produce an acid of the formula:

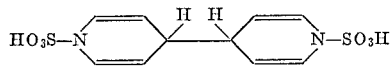

20. A method of preparing heterocyclic sulfamic acids which comprises reacting a disulfamite salt of the formula:

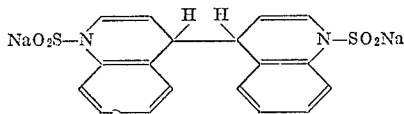

with hydrogen peroxide to produce a disulfamate salt, and acidifying the disulfamate salt to produce an acid of the formula:

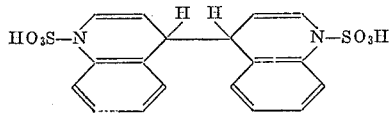

21. A method of preparing heterocyclic sulfamic acids which comprises reacting a disulfamite salt of the formula:

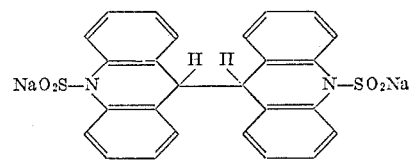

with hydrogen peroxide to produce a disulfamate salt, and acidifying the disulfamate salt to produce an acid of the formula:

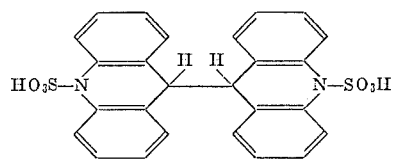

22. A method of preparing esters which comprises reacting a compound of the group consisting of salts of the formulas:

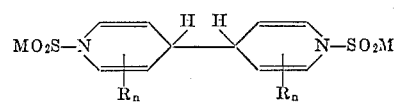

and

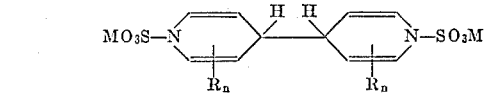

where M is an alkali metal, R is a lower alkyl radical, and $n$ is an integer of 0 to 4, with a mono-halogenated $C_1$–$C_{20}$ hydrocarbon of the group consisting of saturated aliphatic, mono-olefinic and alicyclic hydrocarbons.

No references cited.